(12) United States Patent
Ogras et al.

(10) Patent No.: US 12,332,707 B2
(45) Date of Patent: Jun. 17, 2025

(54) HiLITE: HIERARCHICAL AND LIGHTWEIGHT IMITATION LEARNING FOR POWER MANAGEMENT OF EMBEDDED SoCS

(71) Applicants: Arizona Board of Regents on Behalf of Arizona State University, Scottsdale, AZ (US); Arizona Board of Regents on Behalf of the University of Arizona, Tucson, AZ (US); Board of Regents, The University of Texas System, Austin, TX (US); Carnegie Mellon University, Pittsburgh, PA (US)

(72) Inventors: Umit Ogras, Tempe, AZ (US); Radu Marculescu, Austin, TX (US); Ali Akoglu, Tucson, AZ (US); Chaitali Chakrabarti, Tempe, AZ (US); Daniel Bliss, Phoenix, AZ (US); Samet Egemen Arda, Chandler, AZ (US); Anderson Sartor, La Jolla, CA (US); Nirmal Kumbhare, Tucson, AZ (US); Anish Krishnakumar, Madison, WI (US); Joshua Mack, Tucson, AZ (US); Ahmet Goksoy, Madison, WI (US); Sumit Mandal, Madison, WI (US)

(73) Assignees: ARIZONA BOARD OF REGENTS ON BEHALF OF ARIZONA STATE UNIVERSITY, Scottsdale, AZ (US); ARIZONA BOARD OF REGENTS ON BEHALF OF THE UNIVERSITY OF ARIZONA, Tucson, AZ (US); BOARD OF REGENTS, THE UNIVERSITY OF TEXAS SYSTEM, Austin, TX (US); CARNEGIE MELLON UNIVERSITY, Pittsburgh, PA (US)

( * ) Notice: Subject to any disclaimer, the term of this patent is extended or adjusted under 35 U.S.C. 154(b) by 79 days.

(21) Appl. No.: 18/249,876

(22) PCT Filed: Oct. 22, 2021

(86) PCT No.: PCT/US2021/056275
§ 371 (c)(1),
(2) Date: Apr. 20, 2023

(87) PCT Pub. No.: WO2022/087428
PCT Pub. Date: Apr. 28, 2022

(65) Prior Publication Data
US 2023/0393637 A1    Dec. 7, 2023

Related U.S. Application Data

(60) Provisional application No. 63/104,269, filed on Oct. 22, 2020.

(51) Int. Cl.
*G06F 1/26* (2006.01)
(52) U.S. Cl.
CPC .................................... *G06F 1/26* (2013.01)
(58) Field of Classification Search
CPC ........................................................ G06F 1/26
See application file for complete search history.

(56) References Cited

U.S. PATENT DOCUMENTS 8,056,079 B1    11/2011   Martin et al.
2006/0229861 A1  10/2006   Tatsuoka et al.
(Continued)

OTHER PUBLICATIONS

Aalsaud, A. et al., "Power—Aware Performance Adaptation of Concurrent Applications in Heterogeneous Many-Core Systems," ISLPED '16: Proceedings of the 2016 International Symposium on Low Power Electronics and Design, Aug. 2016, ACM, pp. 368-373.
(Continued)

*Primary Examiner* — Stefan Stoynov
(74) *Attorney, Agent, or Firm* — Womble Bond Dickinson (US) LLP

(57) ABSTRACT

Hierarchical and lightweight imitation learning (IL) for power management of embedded systems-on-chip (SoCs), also referred to herein as HiLITE, is provided. Modern SoCs
(Continued)

use dynamic power management (DPM) techniques to improve energy efficiency. However, existing techniques are unable to efficiently adapt the runtime decisions considering multiple objectives (e.g., energy and real-time requirements) simultaneously on heterogeneous platforms. To address this need, embodiments described herein propose HiLITE, a hierarchical IL framework that maximizes energy efficiency while satisfying soft real-time constraints on embedded SoCs. This approach first trains DPM policies using IL; then, it applies a regression policy at runtime to minimize deadline misses. HiLITE improves the energy-delay product by 40% on average, and reduces deadline misses by up to 76%, compared to state-of-the-art approaches. In addition, the trained policies not only achieve high accuracy, but also have negligible prediction time overhead and small memory footprint.

20 Claims, 5 Drawing Sheets

(56) References Cited

U.S. PATENT DOCUMENTS

| | | |
|---|---|---|
| 2007/0250570 A1 | 10/2007 | Van Eyck |
| 2008/0205280 A1 | 8/2008 | Saphir |
| 2009/0249098 A1 | 10/2009 | Han et al. |
| 2011/0321051 A1 | 12/2011 | Rastogi |
| 2014/0101411 A1 | 4/2014 | Sakarda |
| 2016/0081006 A1 | 3/2016 | Reisslein et al. |
| 2016/0142338 A1 | 5/2016 | Steinder et al. |
| 2017/0205863 A1 | 7/2017 | Lee et al. |
| 2019/0258528 A1 | 8/2019 | Yeung et al. |
| 2019/0324806 A1 | 10/2019 | Javre et al. |
| 2020/0278870 A1 | 9/2020 | Saravanan et al. |
| 2023/0393637 A1 | 12/2023 | Ogras et al. |
| 2023/0401092 A1 | 12/2023 | Ogras et al. |
| 2024/0004776 A1 | 1/2024 | Ogras et al. |

OTHER PUBLICATIONS

Aji, A.M. et al., "MultiCL: EnablingAutomatic Scheduling for Task-Parallel Workloads in OpenCL," ParallelComputing, vol. 58, Oct. 2016, preprint Apr. 2016, pp. 37-55.
Amd, "Zynq UltraScale+ MPSoC ZCU102 Evaluation Kit," accessed Oct. 10, 2019 from the Internt: [URL: https://www.xilinx.com/support/document-ation/boards and kits/zcu102/ug1182-zcu102-eval-bd.pdf], 19 pages.
Arabnejad, H. et al., "List Scheduling Algorithm for Heterogeneous Systems by an Optimistic Cost Table," IEEE Transactions on Parallel and Distributed Systems, vol. 25, No. 3, Mar. 2014, pp. 682-694.
ARM, "AMBAR® 4 AXI4-Stream Protocol Specification," Version 1.0, ARM IHI 0051A (ID030610), Mar. 2010, 42 pages.
Arda, S.E. et al., "Work-in-Progress: A Simulation Framework for Domain-Specific System-on-Chips," 2019 International Conference on Hardware/Software Codesign and System Synthesis (CODES+ISSS), Oct. 13-18, 2019, New York, NY, USA, IEEE, 2 pages.
Arda, S. et al. "DS3: A System-Level Domain-Specific System-on-Chip Simulation Framework," IEEE Transactions on Computers, vol. 69, Aug. 2020, preprint Mar. 2020, 15 pages.
Augonnet, C. et al., StarPU: A unified platform for task scheduling on heterogeneous multicore architectures, Concurrency and Computation: Practice and Experience, vol. 23, No. 2, Feb. 2011, John Wiley & Sons, Ltd., pp. 187-198.
Author Unknown, "DSSoC Emulator—A Userspace Environment for Emulating DSSoCs," GitHub, accessed Jan. 20, 2020 from the Internet: [URL: https://github.com/mackncheesiest/DSSoCEmulator], 1 page.
Author Unknown, "TraceAtlas," GitHub, accessed Jan. 20, 2020 from the Internet: [URL: https://github.com/ruhrie/TraceAtlas/], 4 pages.
Author Unknown, Zynq ZCU102 Evaluation Kit, https://www.xilinx.com/products/boardsand-kits/ek-u1-zcu102-g.html, Accessed Apr. 10, 2020.
Baskiyar, S. et al., "Energy Aware DAG Scheduling on Heterogeneous Systems," Cluster Computing, vol. 13, No. 4, Jan. 2010, Springer Science+Business Media, LLC, pp. 373-383.
Beisel, T. et al., "CooperativeMultitasking for Heterogeneous Accelerators in the Linux CompletelyFair Scheduler," IEEE International Conference on Application-Specific Systems, Architectures and Processors (ASAP), Sep. 11-14, 2011, Santa Monica, CA, USA, IEEE, pp. 223-226.
Bhatti, K. et al., "Power Management in Real Time Embedded Systems through Online and Adaptive Interplay of DPM and DVFS Policies," 2010 IEEE/IFIP International Conference on Embedded and Ubiquitous Computing, Dec. 11-13, 2010, Hong Kong, China, IEEE, pp. 184-191.
Bittencourt, L.F. et al., "DAG SchedulingUsing a Lookahead Variant of the Heterogeneous Earliest Finish TimeAlgorithm," 2010 18th Euromicro Conference on Parallel, Distributed and Network-based Processing, Feb. 17-19, 2010, Pisa, Italy, IEEE, pp. 27-34.
Bortolotti, D. et al., "VirtualSoC: a Full-System Simulation Environment for Massively Parallel Heterogeneous System-on-Chip," 2013 IEEE 27th International Symposium on Parallel & Distributed Processing Workshops and PhD Forum, May 2013, IEEE, pp. 2182-2187.
Binkert, N. et al., "The gem5simulator," ACM SIGARCH Computer Architecture News, vol. 39, No. 2, Aug. 31, 2011, ACM, 7 pages.
Bolchini, C. et al., "A Runtime Controller for OpenCL Applications on Heterogeneous System Architectures," ACM SIGBED Review, vol. 15, No. 1, Mar. 2018, ACM, pp. 29-35.
Brodowski, D., "Linux CPUFreq Governors." available as early as Oct. 2020 from the Internet: [URL: https://www.kernel.org/doc/Documentation/cpu-freq/governors.txt], 5 pages.
Casanova, H. et al., "Versatile, Scalable, and Accurate Simulation of Distributed Applications and Platforms," Journal of Parallel and Distributed Computing, vol. 74, No. 10, Oct. 2014, preprint Jul. 2014, pp. 2899-2917.
Chen, Z. et al., "Distributed Reinforcement Learning for Power Limited Many-core System Performance Optimization," Design, Automation and Test in Europe Conference (DATE), Mar. 9-13, 2015, San Jose, CA, USA, pp. 1521-1526.
Das, A. et al., "Adaptive and Hierarchical Runtime Manager for Energy-Aware Thermal Management of Embedded Systems," ACM Transactions on Embedded Computing Systems, vol. 15, No. 2, Jan. 2016, ACM, 25 pages.
Frigo, M et al., "The Design and Implementation of FFTW3," Proceedings of the IEEE, vol. 93, Issue 2, Feb. 2005, first published Jan. 2005, IEEE, 16 pages.
Goel, V. et al., "Constraint programming for LNG ship scheduling and inventory management," European Journal of Operational Research, vol. 241, No. 3, Mar. 2015, Elsevier, pp. 662-673.
Green, S., "Heterogeneous Integration at DARPA: Pathfinding and Progress in Assembly Approaches," 68th IEEE Electronic Components and Technology Conference (ECTC), May 2018, 40 pages.
Gupta, U. et al., "DyPO: Dynamic Pareto-Optimal Configuration Selection for Heterogeneous MpSoCs," ACM Transactions on Embedded Computing Systems, vol. 16, Issue 5s, Article No. 123, Sep. 2017, 20 pages.
Hardkernel, "ODROID-XU3," Hardkernel Co. Ltd., accessed Jan. 26, 2020 from the Internet: [URL: https://www.hardkernel.com/shop/odroid-xu3/], 9 pages.
Hardkernel, "ODROID-XU3," Odroid Wiki, accessed Mar. 20, 2020 from the Internet: [URL: https://wiki.odroid.com/old_product/odroid-xu3/odroid-xu3], 2 pages.
Hennessy, J.L. et al., "A New Golden Age for Computer Architecture," Communications of the ACM, vol. 62, No. 2, Feb. 2019, pp. 48-60.
Hsieh, C. et al., "SURF: Self-aware Unified Runtime Framework for Parallel Programs on Heterogeneous Mobile Architectures,"

(56) References Cited

OTHER PUBLICATIONS

2019 IFIP/IEEE 27th International Conference on Very Large Scale Integration (VLSI-SoC), Oct. 6-9, 2019, Cuzco, Peru, IEEE, 6 pages.

Huang, T.-W. et al., "Cpp-Taskflow: Fast Task-Based Parallel Programming Using Modern C++," International Parallel and Distributed Processing Symposium (IPDPS), May 20-24, 2019, Rio de Janeiro, Brazil, IEEE, pp. 974-983.

Hwang, J.-J. et al. "Scheduling Precedence Graphs in Systems with Interprocessor Communication Times." SIAM Journal on Computing, vol. 18, Issue 2, Apr. 1989, Society for Industrial and Applied Mathematics, pp. 244-257.

Ichiro, K., "u-dma-buf (User space mappable DMA Buffer," GitHub, accessed Jan. 20, 2020 from the Internet: [URL: https://github.com/ikwzm/udmabuf], 19 pages.

Islam, F. M. M. et al., "Hybrid DVFS Scheduling for Real-Time Systems Based on Reinforcement Learning," IEEE Systems Journal, vol. 11, No. 2, Jun. 2017, pp. 931-940.

Islam, F. M. M. et al., "Task aware hybrid DVFS for multi-core real-time systems using machine learning," Information Sciences, vol. 433-434, Apr. 2018, Elsevier, pp. 315-332.

Kim, R.G. et al., "Imitation Learning for Dynamic VFI Control in Large-Scale Manycore Systems," IEEE Transactions on Very Large Scale Integration (VLSI) Systems, vol. 25, No. 9, Sep. 2017, first published May 2017, pp. 2458-2471.

Koeplinger, D. et al., "Automatic generation of efficient accelerators for reconfigurable hardware," ACM SIGARCH Computer Architecture News, vol. 44, Issue 3, Jun. 2016, pp. 115-127.

Krishnakumar, A. et al., "Runtime Task Scheduling using Imitation Learning for Heterogeneous Many-Core Systems," arXiv:2007.09361v2 [cs.AR], Aug. 6, 2020, 14 pages.

Kwok, Y.-K. et al., "Dynamic Critical-Path Scheduling: An Effective Technique for Allocating Task Graphs to Multiprocessors," IEEE Transactions on Parallel and Distributed Systems, vol. 7, Issue 5, May 1996, IEEE, pp. 506-521.

Lattner, C. et al., "LLVM: A compilation framework for lifelong program analysis & transformation," International Symposium on Code Generation and Optimization (CGO), Mar. 20-24, 2004, San Jose, CA, USA, IEEE, 12 pages.

Mack, J. et al., "User-Space Emulation Framework for Domain-Specific SoC Design," arXiv:2004.01636v2 [cs.DC], Apr. 12, 2020, 11 pages.

Magarshack, P. et al., "System-on-chip beyond the nanometer wall," Proceedings of the 2003 Design Automation Conference (DAC), Jun. 2-6, 2003, Anaheim, CA, USA, IEEE, pp. 419-424.

Mandal, S.K. et al., "An Energy-Aware Online Learning Framework for Resource Management in Heterogeneous Platforms," ACM Transactions on Design Automation of Electronic Systems (TODAES), vol. 25, Issue 3, Article No. 28, May 2020, 26 pages.

Mandal, S.K. et al., "Dynamic Resource Management of Heterogeneous Mobile Platforms via Imitation Learning," IEEE Transactions on Very Large Scale Integration (VLSI) Systems, vol. 27, Issue 12, Dec. 2019, first published Jul. 2019, IEEE, pp. 2842-2854.

Mao, H. et al., "Learning Scheduling Algorithms for Data Processing Clusters," SIGCOMM '19: Proceedings of the ACM Special Interest Group on Data Communication, Aug. 2019, ACM, pp. 270-288.

Mao, H. et al., "Resource Management with Deep Reinforcement Learning," ACM Workshop on Hot Topics in Networks (HotNets-XV), Nov. 9-10, 2016, IEEE, pp. 50-56.

Mirhoseini, A. et al., "Device Placement Optimization with Reinforcement Learning," Proceedings of the 34th International Conference on Machine Learning, PMLR 70, Aug. 2017, pp. 2430-2439.

Mishra, P. et al., "Post-Silicon Validation in the SoC Era: A Tutorial Introduction," IEEE Design & Test, vol. 34, No. 3, Jun. 2017, first published Apr. 2017, IEEE, pp. 68-92.

Moazzemi, K. et al., "HESSLE-FREE: Heterogeneous Systems Leveraging Fuzzy Control for Runtime Resource Management," ACM Transactions on Embedded Computing Systems (TECS), vol. 18, No. 5s, Article No. 74, Oct. 2019, 19 pages.

Mueller, F., "A Library Implementation of POSIX Threads under UNIX," USENIX Winter, Jan. 25-29, 1993, San Diego, CA, pp. 29-42.

Pabla, C.S., "Completely Fair Scheduler," Linux Journal, No. 184, 2009, available on the Internet: [URL: https://dl.acm.org/doi/fullHtml/10.5555/1594371.1594375], 6 pages.

Power, J. et al., "gem5-gpu: A heterogeneous CPU-GPU simulator," IEEE Computer Architecture Letters, vol. 14, No. 1, Jan.-Jun. 2015, first published Jan. 2014, IEEE, pp. 34-36.

Reddy, B.K. et al., "Inter-Cluster Thread-to-Core Mapping and DVFS on Heterogeneous Multi-Cores," IEEE Transactions on Multi-Scale Computing Systems, vol. 4, No. 3, Jul.-Sep. 2018, first published Sep. 2017, IEEE, pp. 369-382.

Ross, S. et al., "A Reduction of Imitation Learning and Structured Prediction to No-regret Online Learning," Proceedings of the Fourteenth International Conference on Artificial Intelligence and Statistics (AISTATS), Apr. 2011, F. Lauderdale, FL, USA, pp. 627-635.

Rossi, F. et al., "Handbook of Constraint Programming," Elsevier, Mar. 2006, 969 pages.

Sadowski, G. et al., "Design Challenges Facing CPU-GPU-Accelerator Integrated Heterogeneous Systems," 51st Design Automation Conference (DAC), Jun. 2014, 18 pages.

Sakellariou, R. et al., "A Hybrid Heuristic for DAG Scheduling on Heterogeneous Systems," 18th International Parallel and Distributed Processing Symposium, Apr. 26-30, 2004, Santa Fe, NM, USA, IEEE, 13 pages.

Sartor, A.L. et al., "HiLITE: Hierarchical and Lightweight Imitation Learning for Power Management of Embedded SoCs," IEEE Computer Architecture Letters, vol. 19, No. 1, Jan.-Jun. 2020, first published May 2020, IEEE, pp. 63-67.

Schaal, S., "Is Imitation Learning the Route To Humanoid Robots?" Trends in Cognitive Sciences, vol. 3, No. 6, Jun. 1999, pp. 233-242.

Siemens, "Veloce Hardware-Assisted Verification Platform," accessed Jan. 2, 2020 from the Internet: [URL: https://www.mentor.com/products/fv/emulation-systems/veloce], 8 pages.

Sutton, R.S. et al., "Policy Gradient Methods for Reinforcement Learning with Function Approximation," Advances in Neural Information Processing Systems (NIPS 1999), Nov. 29-Dec. 4, 1999, pp. 1057-1063.

Swaminathan, V. et al., "Real-Time Task Scheduling for Energy-Aware Embedded Systems," Journal of the Franklin Institute, vol. 338, No. 6, Sep. 2001, Elsevier, pp. 729-750.

Synopsys, "ZeBu Server 4," Accessed Jan. 2, 2020 from the Internet: [URL: https://synopsys.adobecqms.net/verification/emulation/zebu-server.html], 7 pages.

Topcuoglu, H. et al., "Performance-Effective and Low-Complexity Task Scheduling for Heterogeneous Computing," IEEE Transactions on Parallel and Distributed Systems, vol. 13, Issue 3, Mar. 2002, IEEE, pp. 260-274.

Uhrie, R. et al., "Machine understanding of domain computation for domain-specific system-on-chips (dssoc)," Proceedings of the SPIE, vol. 11015, id. 110150O, Apr. 2019, 8 pages.

Ullman, J.D., "NP-complete scheduling problems," Journal of Computer and System Sciences, vol. 10, No. 3, Jun. 1975, Elsevier, pp. 384-393.

Vasile, M.-A. et al., "Resource-Aware Hybrid Scheduling Algorithm in Heterogeneous Distributed Computing," Future Generation Computer Systems, vol. 51, Oct. 2015, Elsevier, pp. 61-71.

Vehtari, A. et al., "Practical Bayesian Model Evaluation using Leave-one-out Cross-validation and WAIC," Statisticsand Computing, vol. 27, No. 5, 2017, first published Aug. 2016, Springer, pp. 1413-1432.

Wang, Y. et al., "Multi-Objective Workflow Scheduling with Deep-Q-Network-based Multi-Agent Reinforcement Learning," IEEE Access, vol. 7, Mar. 2019, IEEE, pp. 39974-39982.

Wen, Y. et al., "Smart Multi-Task Scheduling for OpenCL Programs on CPU/GPU Heterogeneous Platforms," 2014 21st International Conference on High Performance Computing (HiPC), Dec. 17-20, 2014, Goa, India, IEEE, 10 pages.

Xian, C. et al., "Dynamic Voltage Scaling for Multitasking Real-time Systems with Uncertain Execution Time," IEEE Transactions

(56) References Cited

OTHER PUBLICATIONS on Computer-Aided Design of Integrated Circuits and Systems, vol. 27, No. 8, Aug. 2008, pp. 1467-1478.

Xiaoyong, T. et al., "A Novel Security-Driven Scheduling Algorithm for Precedence-Constrained Tasks in Heterogeneous Distributed Systems," IEEE Transactions on Computers, vol. 60, No. 7, Jul. 2011, first published Jun. 2010, IEEE, pp. 1017-1029.

Xie, G. et al., "Mixed Real-Time Scheduling of Multiple DAGs-based Applications on Heterogeneous Multi-core Processors," Microprocessors and Microsystems, vol. 47, Part A, Nov. 2016, IEEE, pp. 93-103.

Yourst, M.T., "PTLsim: A Cycle Accurate Full System x86-64 Microarchitectural Simulator," International Symposium on Performance Analysis of Systems & Software, Apr. 25-27, 2007, San Jose, CA, USA, IEEE, pp. 23-34.

International Search Report and Written Opinion for International Patent Application No. PCT/US2021/056258, mailed May Jan. 26, 2022, 8 pages.

International Search Report and Written Opinion for International Patent Application No. PCT/US2021/056275, mailed Jan. 26, 2022, 9 pages.

Invitation to Pay Additional Fees for International Patent Application No. PCT/US2021/056290, mailed Dec. 16, 2021, 2 pages.

International Search Report and Written Opinion for International Patent Application No. PCT/US2021/056290, mailed Feb. 24, 2022, 10 pages.

HiLITE: HIERARCHICAL AND LIGHTWEIGHT IMITATION LEARNING FOR POWER MANAGEMENT OF EMBEDDED SoCS

RELATED APPLICATIONS

This application is a 35 U.S.C. § 371 national phase filing of International Application No. PCT/US2021/056275, filed Oct. 22, 2021, and claims the benefit of U.S. Provisional Patent Application No. 63/104,269, filed Oct. 22, 2020, wherein the entire contents of the foregoing applications are hereby incorporated by reference herein.

GOVERNMENT SUPPORT

This invention was made with government support under FA8650-18-2-7860 awarded by the Defense Advanced Research Projects Agency. The government has certain rights in the invention.

FIELD OF THE DISCLOSURE

The present disclosure is related to power management of processing devices.

BACKGROUND

Systems-on-chip (SoCs) should be designed to meet aggressive performance requirements while coping with limited battery capacity, thermal design power (TDP), and real-time (RT) constraints. A step in this direction consists of exploiting heterogeneity, e.g., using big cores when high performance is needed and switching to little cores otherwise. In addition, techniques such as dynamic voltage and frequency scaling (DVFS) and power gating (PG) can be used at runtime to manage the power consumption of SoCs. However, the design space of runtime decisions explodes combinatorially with the number of cores, frequency levels, and power states. Additionally, current platforms serve a wide range of applications with distinct characteristics and requirements. The extensive design space and the growing variety of applications call for new runtime techniques to efficiently manage the power and performance of embedded heterogeneous platforms.

Prior works on heterogeneous platforms use machine learning to improve the energy efficiency with respect to dynamic power management (DPM) techniques present in commercial SoCs. However, these studies do not take RT constraints and PG into consideration. Likewise, hierarchical power management techniques do not target these metrics; instead, they use reinforcement learning (RL) and specialized heuristics for energy optimization in homogeneous platforms. Targeting additional constraints such as RT is non-trivial, and if the DPM techniques do not apply specific mechanisms to address these constraints, they deliver suboptimal results. For instance, such an approach results in high deadline misses for RT applications.

Some previous works use RL to optimize for RT constraints. However, RL increases exponentially in size as the state and action spaces increase. Instead, imitation learning (IL) is used by these works to train a DPM policy that efficiently explores a large design space. One approach considers RT and PG, but simply selects between two heuristic-based policies for DVFS and PG. Each of these previous approaches only consider homogeneous platforms and often single-core processors, hence, such techniques are not able to efficiently optimize a heterogeneous SoC. Therefore, given the constraints in current SoCs, new techniques that are able to adapt the runtime decisions to different objectives and constraints are needed.

SUMMARY

Hierarchical and lightweight imitation learning (IL) for power management of embedded systems-on-chip (SoCs), also referred to herein as HiLITE, is provided. Modern SoCs use dynamic power management (DPM) techniques to improve energy efficiency. However, existing techniques are unable to efficiently adapt the runtime decisions considering multiple objectives (e.g., energy and real-time requirements) simultaneously on heterogeneous platforms. To address this need, embodiments described herein propose HiLITE, a hierarchical IL framework that maximizes energy efficiency while satisfying soft real-time constraints on embedded SoCs.

This approach first trains DPM policies using IL; then, it applies a regression policy at runtime to minimize deadline misses. HiLITE improves the energy-delay product by 40% on average, and reduces deadline misses by up to 76%, compared to state-of-the-art approaches. In addition, the trained policies not only achieve high accuracy, but also have negligible prediction time overhead and small memory footprint.

An exemplary embodiment provides a method for hierarchical power management in a heterogeneous SoC. The method includes obtaining a plurality of application tasks for execution by the heterogeneous SoC, obtaining IL policies for reducing an energy-delay product during execution of the plurality of application tasks, and applying the IL policies at a first level to predict power requirements for executing the plurality of application tasks.

Another exemplary embodiment provides a DPM framework. The DPM framework includes a heterogeneous SoC simulator configured to simulate execution of a plurality of application tasks by a heterogeneous SoC and a power manager configured to apply IL-based power policies to the heterogeneous SoC during execution of the plurality of tasks. The power manager includes a first level configured to make processing power decisions based on predicting power requirements for implementing the IL-based power policies and a second level configured to adjust the first level processing power decisions during run-time.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
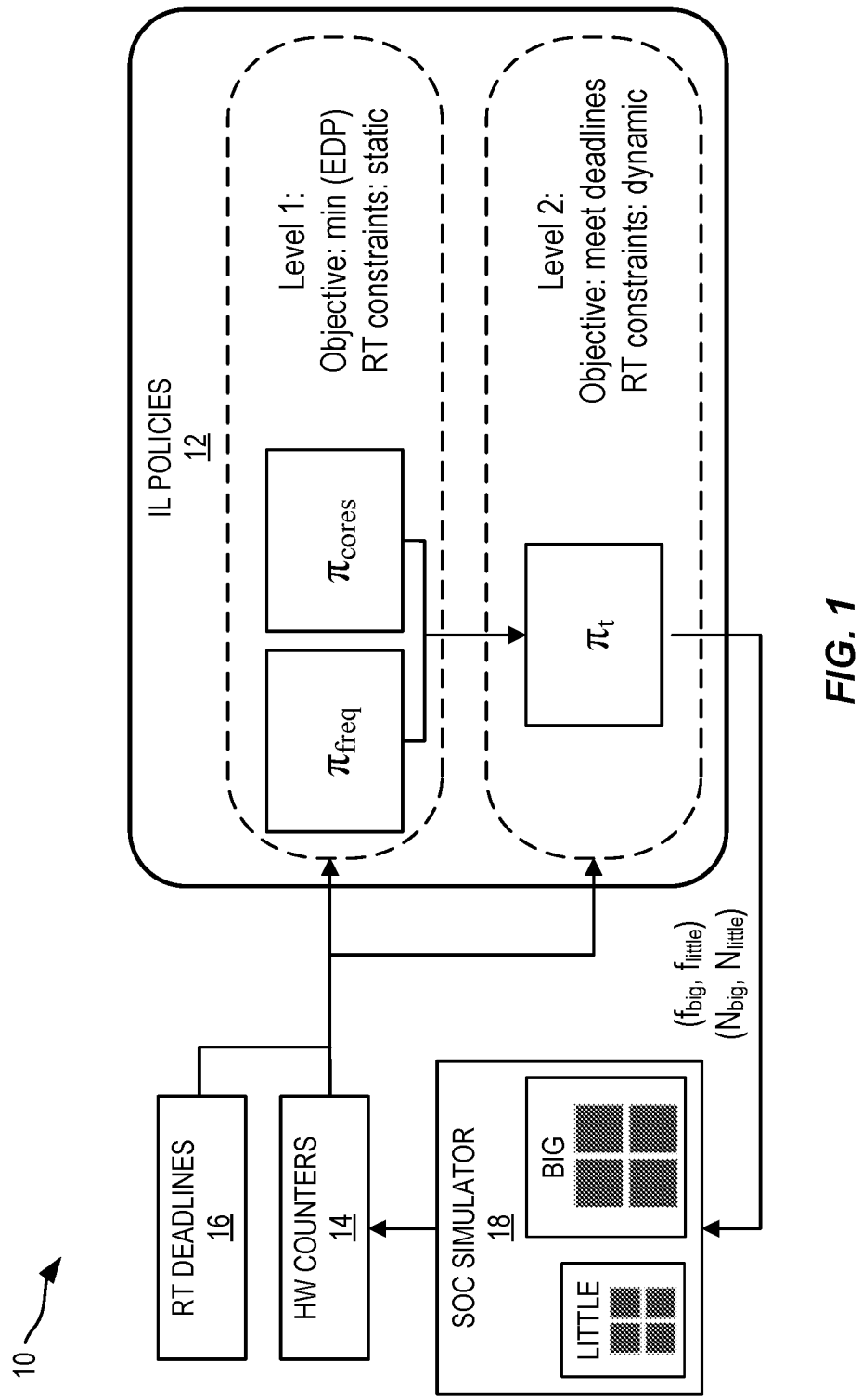
FIG. 1 is a schematic diagram of an exemplary embodiment of hierarchical and lightweight imitation learning (IL) for power management of embedded systems-on-chip (SoCs), also referred to herein as HiLITE.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Hierarchical and lightweight imitation learning (IL) for power management of embedded systems-on-chip (SoCs), also referred to herein as HiLITE, is provided. Modern SoCs use dynamic power management (DPM) techniques to improve energy efficiency. However, existing techniques are unable to efficiently adapt the runtime decisions considering multiple objectives (e.g., energy and real-time requirements) simultaneously on heterogeneous platforms. To address this need, embodiments described herein propose HiLITE, a hierarchical IL framework that maximizes energy efficiency while satisfying soft real-time constraints on embedded SoCs.

This approach first trains DPM policies using IL; then, it applies a regression policy at runtime to minimize deadline misses. HiLITE improves the energy-delay product by 40% on average, and reduces deadline misses by up to 76%, compared to state-of-the-art approaches. In addition, the trained policies not only achieve high accuracy, but also have negligible prediction time overhead and small memory footprint.

I. Introduction

The present disclosure proposes HiLITE, a hierarchical DPM framework that uses IL to minimize the energy-delay product (EDP), while coping with soft real-time (RT) constraints in SoCs. To this end, an oracle is first constructed using power and performance data of domain-specific applications, namely wireless communications and radar systems. Then, IL policies are trained to achieve low EDP while considering soft deadlines, by adjusting the frequency and number of active cores in LITTLE and big clusters.

An offline trained policy can set the operating point successfully for energy optimization, but it may miss deadlines due to the unpredictable dynamic variations of the workload and scheduling. Therefore, the present disclosure further proposes a novel online regression policy that fine-tunes the policy decisions to address these variations.

Embodiments described herein can provide the following advantages:
- A hierarchical framework that comprises lightweight IL policies to maximize energy-efficiency and a regression policy for fine-tuning the SoC configuration to meet RT constraints.

Design- and run-time approaches for coping with execution deadlines, while optimizing the energy consumption.

Validation of the simulation results against a commercial SoC with respect to performance, power, and temperature.

II. Hierarchical Deadline-Aware DPM

FIG. 1 is a schematic diagram of an exemplary embodiment of HiLITE 10. This section presents oracle generation methodology and deadline-aware IL policies 12 in HiLITE 10 as illustrated in FIG. 1.

A. Oracle Generation

To characterize the impact of the power management configuration (e.g., cluster frequencies) on system performance and energy consumption and to enable Oracle generation, microbenchmarks are constructed that consist of a fixed number of frames. The frames are the basic unit of data processed by each application, so each frame contains 64 bits for most target applications. Each microbenchmark is run on the Odroid-XU3 board for each supported configuration and store performance counters, execution time, and power consumption. Therefore, this methodology preserves the workload when evaluating microbenchmarks with different frequency levels and number of cores. In evaluations, each microbenchmark consists of ten frames and is long enough to collect reliable statistics. The frames within each microbenchmark are executed in parallel based on the availability of resources and the rate at which they are injected into the system. Finally, a workload is a collection of such microbenchmarks.

All possible combinations are evaluated for ten frames in a microbenchmark with five applications (presented in Section III-B), resulting in 1001 unique microbenchmarks. Each of these microbenchmarks is evaluated with all combinations of frequency states: eight for the big cluster (0.6-2.0 GHz) and five for the LITTLE (0.6-1.4 GHz), using a 200 MHz step, and all number of cores (1-4 big and 1-4 LITTLE); this results in more than 640 K samples. Based on these samples, the oracle chooses the configuration that minimizes the EDP of each microbenchmark, while considering the RT constraints. The oracle ($\pi^*_K$ for each microbenchmark k is expressed in Equation 1 as:

$$\pi^*_k = \arg\min_{C_i \in C}\{E_k(C_i) \times i_k(C_i)\} \quad (1)$$

$$\text{s.t. } t_k(C_i) \leq D_k, k = 1, 2, \ldots, \binom{F + A - 1}{A - 1}$$

where C represents all possible combinations of frequency points and number of cores ($f_{points}$(LITTLE)×$f_{points}$(big)× $N_{cores}$(LITTLE)×$N_{cores}$(big)). The index k represents each unique microbenchmark based on the binomial coefficient of F frames per microbenchmark and A applications. $E_k(C_i)$ and $t_k(C_i)$ denote the energy consumption and execution time of a given microbenchmark at configuration $C_i$, respectively. Finally, $D_k$ is the deadline of microbenchmark k.

The oracle generates two tuples in the following format: ($f_{big}$, $f_{little}$), ($N_{big}$, $N_{little}$) for the policies predicting the frequency and number of cores, respectively. Similarly, for the regression policy, the measured execution time is used as the oracle.

B. Imitation Learning Policies

Exact imitation trains a policy that closely follows the oracle. However, it may suffer from error propagation, i.e., errors in previous states affect the decisions for the next ones. To address this issue, an IL approach called DAgger is employed, which is applied to all three proposed policies (prediction of frequencies, number of cores, and execution time). More precisely, at every control interval (typically 50-100 ms), the IL policy 12 makes a prediction, which is applied to the system and compared against the oracle. If the prediction differs from the oracle, this sample is aggregated to the dataset and the execution continues. No action is taken if the prediction aligns with the oracle. After the execution finishes, the aggregated dataset is used to retrain the IL policy 12 in order to teach the IL policy 12 to learn from the mistakes made during the previous iterations.

Table 1 presents the features that are used to train the IL policies 12. These hardware counters 14 are normalized to the number of instructions in order to generalize to other applications with similar characteristics.

TABLE 1

Features for training the IL policies

| Current state | Number active cores (big cluster) Number active cores (LITTLE cluster) Frequency big cluster Frequency LITTLE cluster | HW counters | CPU cycles Branch misprediction L2 cache misses Data memory access Non-cache external mem. req. |
| --- | --- | --- | --- |

C. Runtime Management of Deadline Constraints

Both design- and run-time techniques are proposed to cope with deadline constraints. More precisely, at the design time, the oracle generation is modified to consider RT deadline constraints 16, as in Equation 1. At runtime, a hierarchical approach is employed to estimate the execution time, which addresses the workload runtime variations.

Algorithm 1 depicts the proposed hierarchical structure of HiLITE 10; this algorithm is applied at each control interval. First, the IL policies 12 get the current system state and hardware counters 14, then perform the inference for the frequency and number of cores. The regression policy is activated only if the microbenchmark has a deadline. Then, the predicted execution time $t_{pred}$ (line 8 in Algorithm 1) is compared against the deadline; if the predicted execution time is greater than the deadline $D_k$, the following measures are applied: 1) increase the frequency/voltage of the big and LITTLE clusters by one increment (lines 12-13), and 2) if the frequency is already at the maximum for both clusters, increase the number of active cores by one (line 17). Otherwise, if the predicted time does not exceed the deadline, the execution continues following the level 1 IL policies 12. Power gating (PG) is applied to the inactive cores of each cluster. The frequency is increased first because turning on an additional core incurs more overhead than increasing the frequency of an active core.

---

Algorithm 1: Hierarchical structure of HiLITE

/* Level 1 */
1  s ← get current state and hardware counters
2  foreach $Cl_i$ in Clusters do
3      $f(Cl_i)$ ← $\pi_{freq}(s)[Cl_i]$ -continued Algorithm 1: Hierarchical structure of HiLITE

```
4        |    V(Cl_i) ← voltage point w.r.t. f(Cl_i)
5        |_   cores(Cl_i) ← π_cores(s)[Cl_i]
         */ Level 2 */
6    if workload has real-time constraints then
7        |    s ← get current state and hardware counters
8        |    t_pred(k) ← π_t(s)
9        |    if t_pred(k) > D_k then
10       |    |   foreach Cl_i in Clusters do
11       |    |   |   if f(Cl_i) < max {f(Cl_i)} then
12       |    |   |   |   f(Cl_i) ← next frequency point of Cl_i
13       |    |   |   |_  V(Cl_i) ← next voltage point of Cl_i
             |    |   |_
14       |    |   if ∀Cl_i in Clusters, f(Cl_i) = max{f(Cl_i)} then
15       |    |   |  foreach Cl_i in Clusters do
16       |    |   |   |   if cores(Cl_i) < max{cores(Cl_i)} then
17       |    |   |   |   |_   cores(Cl_i) ← cores(Cl_i) + 1
             |    |   |   |_
             |    |   |_
             |    |_
         |_
18   ∀Cl_i in Clusters, apply PG to the inactive cores of Cl_i
```

As the hierarchical approach is applied at runtime, the frequency and number of cores are fine-tuned only if necessary. If this methodology is applied entirely at design-time, the oracle decisions overestimate the required frequency and number of cores for all samples, to achieve the same level of deadline misses from the hierarchical approach. This increases the EDP by around 20% with respect to the hierarchical IL policies 12. Hence, the hierarchical approach addresses these issues by providing a generic and more efficient solution at runtime.

III. Evaluation Results

A. Methodology and Evaluation Setup

Since embodiments focus on lightweight IL techniques, decision trees are used for level 1 and a regression tree is used for level 2 to achieve fast training and inference. For training, leave-one-out cross-validation is used to completely remove frames from a specific application from the dataset. Then, a workload that contains frames from the removed application is run to test the model generalization to unseen applications. For testing, workloads with 50 microbenchmarks are considered and executed 5 times (standard deviation of less than 1%). For each execution, 10 DAgger iterations are applied.

Two main scenarios are evaluated with the target applications: 1) Regular workload of a communication system, having an average of 1.25 frames being processed in parallel with up to 5 parallel frames; and 2) Heavy workload with 3 parallel frames on average and up to 8 frames (i.e., 100% utilization as there are 8 cores in total).

The proposed approach is tested under different RT-constrained scenarios by generating bounded random deadlines ($D_k$) for each microbenchmark. This allows the generation of deadline constraints based on profiled requirements instead of manually inputting the deadline for each microbenchmark, hence, allowing a flexible evaluation of different scenarios. To achieve this, a random number R is generated from a uniform distribution U between a specified low ($D_{TLow}$) and high ($D_{THigh}$) thresholds. These thresholds can range from 0% to 100%. Then, R is multiplied by the range of the microbenchmark's execution time and add the minimum execution time $\min_{C_i \in C}\{t_k(C_i)\}$. So, the deadline for microbenchmark k is given by Equation 2:

$$D_k = \min_{C_i \in C}\{t_k(C_i)\} + \qquad (2)$$
$$(R \sim U([D_{TLow}, D_{THigh}]) \div 100) \times \left(\max_{C_i \in C}\{t_k(C_i)\} - \min_{C_i \in C}\{t_k(C_i)\}\right)$$

The following deadline ranges are evaluated: $D_T$=0-5%, $D_T$=5-10%, and $D_T$=10-20%, in decreasing order of difficulty to satisfy.

B. Simulation Framework Overview and Validation

The system-level SoC simulator 18 proposed in S. E. Arda et al., "DS3: A System-Level Domain-Specific System-on-Chip Simulation Framework," in *IEEE Transactions on Computers*, vol. 69, no. 8, pp. 1248-1262, 2020 (referred to hereinafter as "DS3," the disclosure of which is incorporated herein by reference in its entirety) is extended to incorporate the proposed IL technique.

Platform Model: To ensure high fidelity, the simulator 18 is calibrated using the performance monitoring unit (PMU), current and temperature sensors of the Odroid-XU3. This board allows changing the frequencies only at the cluster level and does not apply PG. To make the design more flexible and explore better power/performance tradeoffs, a per-core PG technique is implemented in the simulator 18.

Benchmark Applications: Five multi-threaded reference applications are considered from wireless communications and radar processing domains: WiFi transmitter (WiFi-TX), WiFi receiver (WiFi-RX), range detection (Range-Det), single-carrier transmitter (SCT), and single-carrier receiver (SCR). All these are representative examples of streaming applications with soft RT constraints.

Data Collection: The applications' source code is instrumented with performance application programming interface (PAPI) calls to profile power, performance, and hardware counter data on the Odroid-XU3.

Execution time, power, and temperature reported by the simulator 18 are compared against measurements on an Odroid-XU3, while running the benchmark applications. The simulator 18 has only 2.8%, 6.1%, and 2.4% error, on average, for these three metrics when the LITTLE and big core frequencies are swept for multi-threaded applications. Similarly, when sweeping the different number of cores results in 2.7%, 1.3%, and 3.8% error on average, respectively. The complete evaluation for both single- and multi-threaded applications and the validation data can be found in DS3.

C. Accuracy Evaluation

Figure 2:
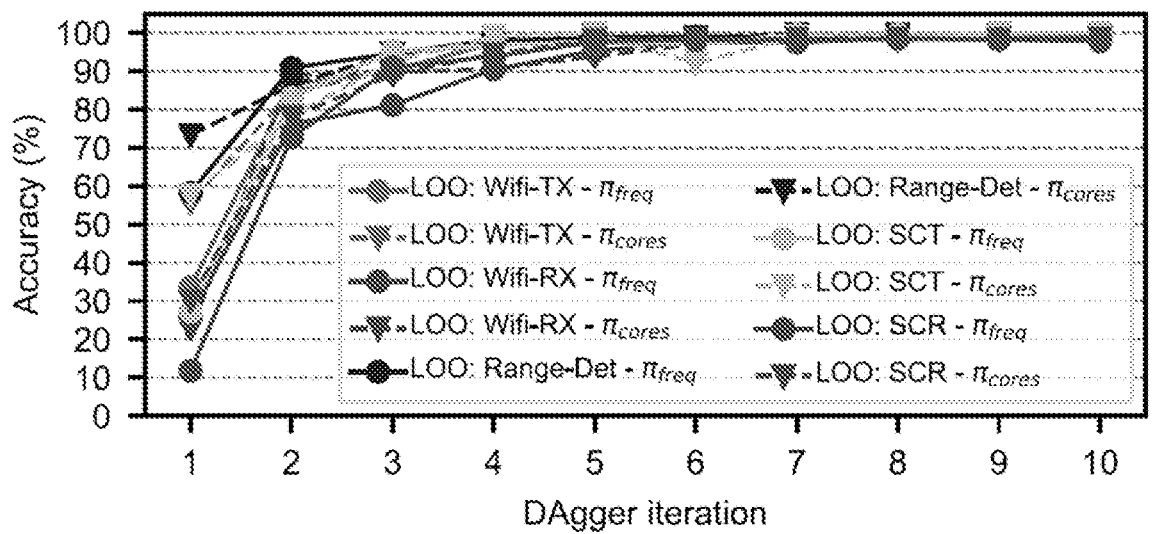
FIG. 2 is a graphical representation of decision tree accuracy as DAgger iteratively trains policies using leave-one-out (LOO) cross-validation for each application.

FIG. 2 is a graphical representation of decision tree accuracy as DAgger iteratively trains policies using leave-one-out (LOO) cross-validation for each application. The decision tree quickly learns as DAgger iterations are applied and achieves 99.1% accuracy on average. The accuracy at the first iteration ranges from 11.8% to 73.3%, and by the fourth iteration, all policies are already above 90%. The regression policy (level 2) achieves an R2 metric of 99.7%, closely following the oracle. The policies take from 0.013 ms to 0.617 ms per prediction, which is negligible over 50-100 ms control epochs. Likewise, the memory requirements range from 3 KB to 280 KB.

Figure 3:
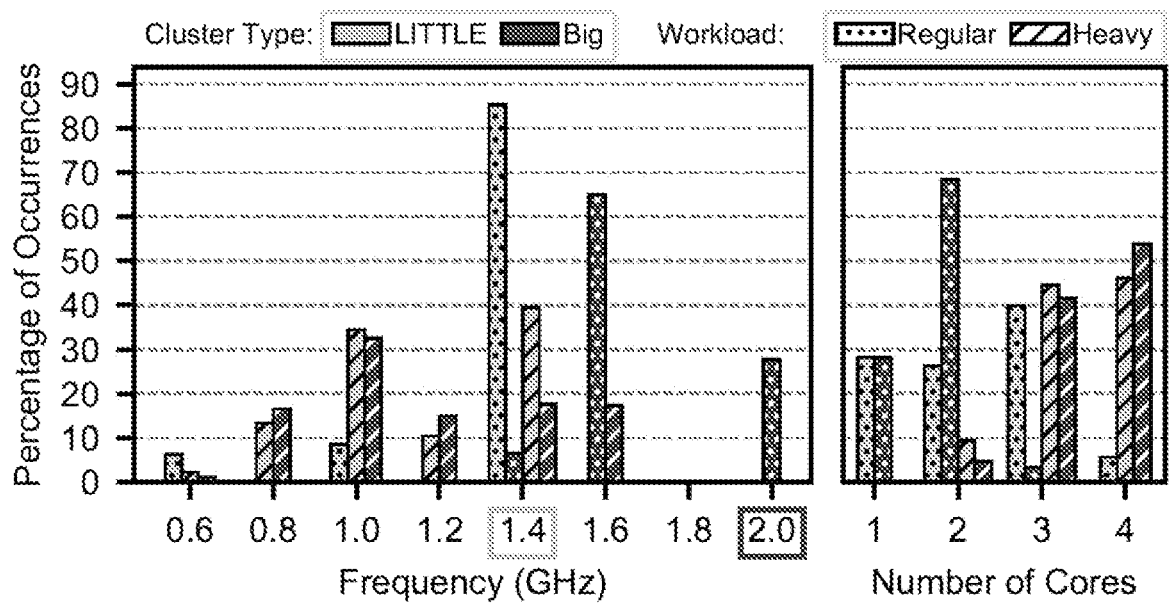
FIG. 3 is a graphical representation of a normalized histogram with respect to total predictions for frequency ($\pi_{freq}$) and number of cores ($\pi_{cores}$).

FIG. 3 is a graphical representation of a histogram normalized with respect to total predictions for frequency ($\pi_{freq}$) and number of cores ($\pi_{cores}$) The circled frequencies depict the maximum frequency for LITTLE (1.4 GHz) and big (2 GHz) clusters. Each bar represents a combination of cluster type and workload, i.e., the LITTLE and big clusters are depicted in different colors, while the regular and heavy workloads are depicted with different patterns. When running a regular load, $\pi_{freq}$ chooses 85% of the time the maximum frequency for the LITTLE (i.e., 1.4 GHz), and high frequencies for the big cluster (65% at 1.6 GHz and 28% at 2 GHz). At the same time, $\pi_{cores}$ chooses more than 95% of the time three or fewer LITTLE cores and two or fewer big cores. This shows that the policies effectively shut down cores when the workload is not heavy. For heavy workloads, the frequencies lie mostly within 0.8 GHz to 1.6 GHz, and $\pi_{cores}$ chooses mostly 3 and 4 cores (around 90% of the time), such that the EDP is minimized as several frames are processed in parallel.

D. Comparison with State-of-the-art Techniques

The approach described herein is compared against performance, powersave, ondemand, and DyPO. The first three belong to the Linux governors and the latter uses machine learning to adjust frequency and number of cores. Two versions of HiLITE are evaluated: first, by only changing the frequency of the clusters (HiLITE$_{(F)}$), and second, by changing both frequency and number of cores (HiLITE$_{(F\text{-}C)}$).

Figure 4A:
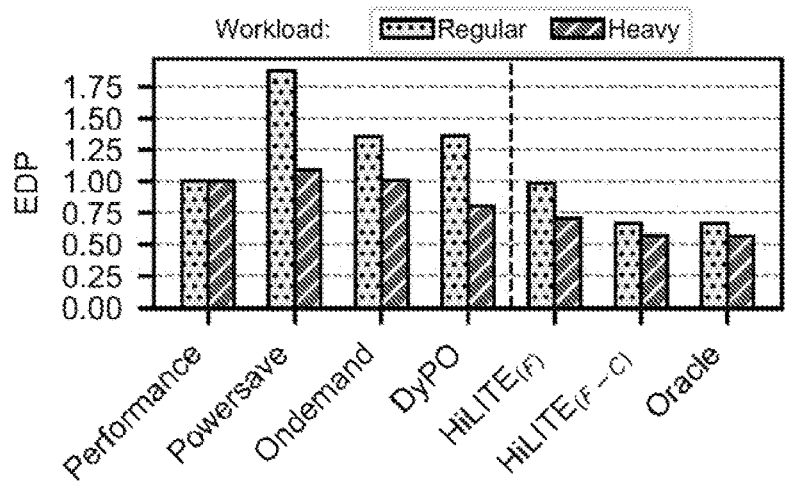
FIG. 4A is a graphical representation of a normalized energy-delay product (EDP) with respect to performance governor.

EDP Evaluation: FIG. 4A is a graphical representation of a normalized EDP with respect to performance governor. HiLITE$_{(F)}$ achieves 2% and 29% reduction for regular and heavy workload scenarios, respectively. The former case leads to smaller improvement since the oracle frequency is high for most of the execution, as discussed above with respect to FIG. 3. When HiLITE$_{(F\text{-}C)}$ is applied, the EDP improvement rises to 34% and 43% with respect to the performance governor, for the same runtime scenarios. Compared to DyPO, HiLITE$_{(F\text{-}C)}$ achieves 51% and 29% lower EDP under regular and heavy workloads, respectively. DyPO is not able to efficiently explore such a large design space since it employs logistic regression followed by k-means clustering; also, DyPO does not exploit PG to further improve the energy efficiency. In addition, HiLITE$_{(F\text{-}C)}$ closely follows the Oracle, being within 0.4% of the Oracle's mark, which is the upper bound for comparison.

Figure 4B:
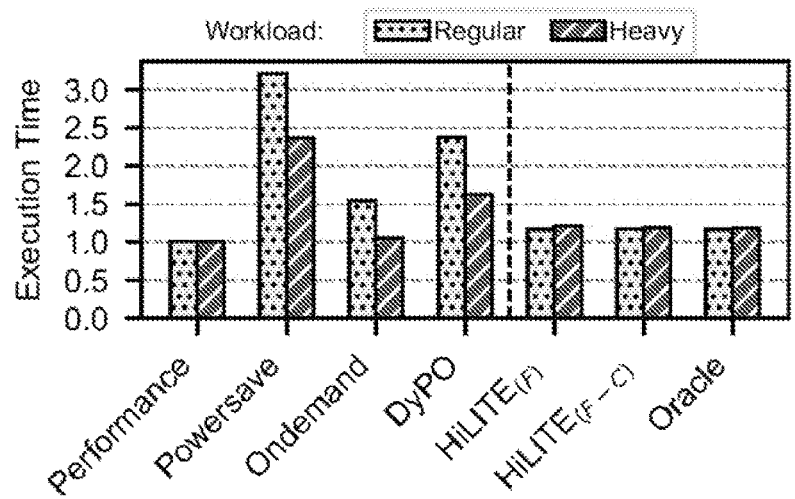
FIG. 4B is a graphical representation of a normalized execution time with respect to performance governor.

Execution Time Evaluation: FIG. 4B is a graphical representation of a normalized execution time with respect to performance governor. HiLITE achieves low performance degradation with respect to the performance mode (16%-21%). While the other baselines have considerably higher degradation: powersave 136-221%, ondemand 5-54%, and DyPO 61-137%.

Figure 4C:
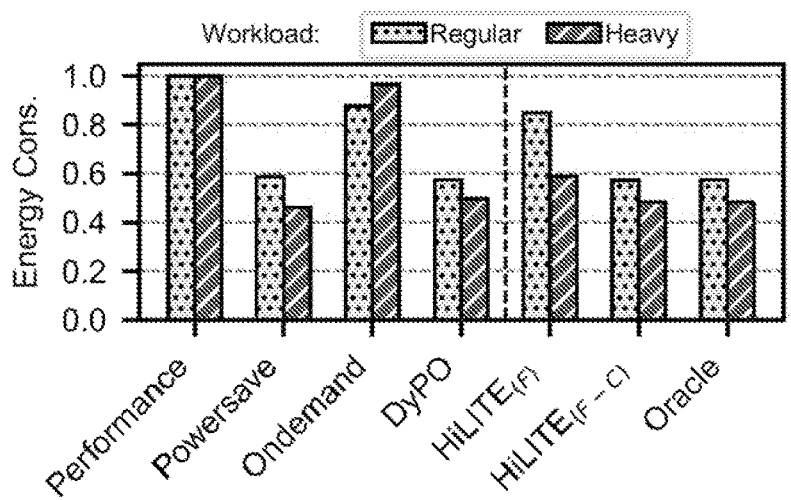
FIG. 4C is a graphical representation of a normalized energy consumption with respect to performance governor.

Energy Consumption Evaluation: FIG. 4C is a graphical representation of a normalized energy consumption with respect to performance governor. HiLITE$_{(F\text{-}C)}$ achieves 43% and 52% energy savings with respect to the performance mode under a regular and heavy workload, respectively.

E. Evaluations under Real-time Constraints

Figure 5:
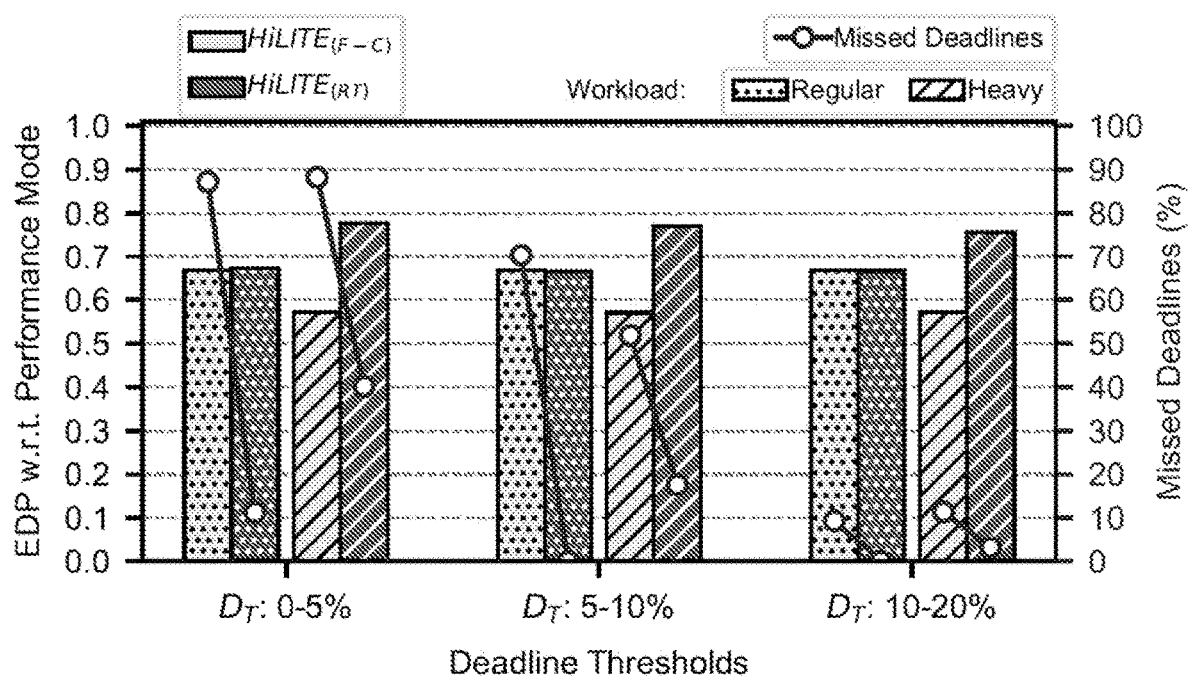
FIG. 5 is a graphical representation of a normalized EDP and percentage of missed deadlines for different techniques and deadline thresholds.

FIG. 5 is a graphical representation of a normalized EDP and percentage of missed deadlines for different techniques and deadline thresholds. As DyPO has considerably higher performance degradation than HiLITE$_{(F\text{-}C)}$ (this leads to even higher deadline misses), HiLITE$_{(F\text{-}C)}$ is chosen as the baseline. HiLITE$_{(RT)}$ represents HiLITE with RT optimization enabled, and under DT=0-5% (i.e., tightest deadlines); this reduces the deadline misses from 87% to 11%, and from 88% to 40% for regular and heavy workloads, respectively. The reduction in the latter case is lower due to multiple frames being processed in parallel. The same trend is observed for $D_T$=5-10%, for the regular workload (70% deadline misses are reduced to 0%) and for the heavy workload (52% to 17%). Further relaxation of these deadline constraints drives the missed deadlines towards zero for both workloads.

For regular workloads, the EDP overhead is low, only 2% on average, while under a heavy workload, there is a trade-off between minimizing the EDP and meeting the deadlines. If the deadlines are prioritized, the EDP improvement goes from 43% to 25%, as the frequency needs to be increased to meet the deadlines.

This evaluation shows that generating an oracle without RT information leads to a high number of deadline misses (close to 90%). In contrast, the proposed approach adds the RT information to the oracle generation and uses a dynamic regression policy to address the runtime variation in the execution time.

IV. Computer System

Figure 6:
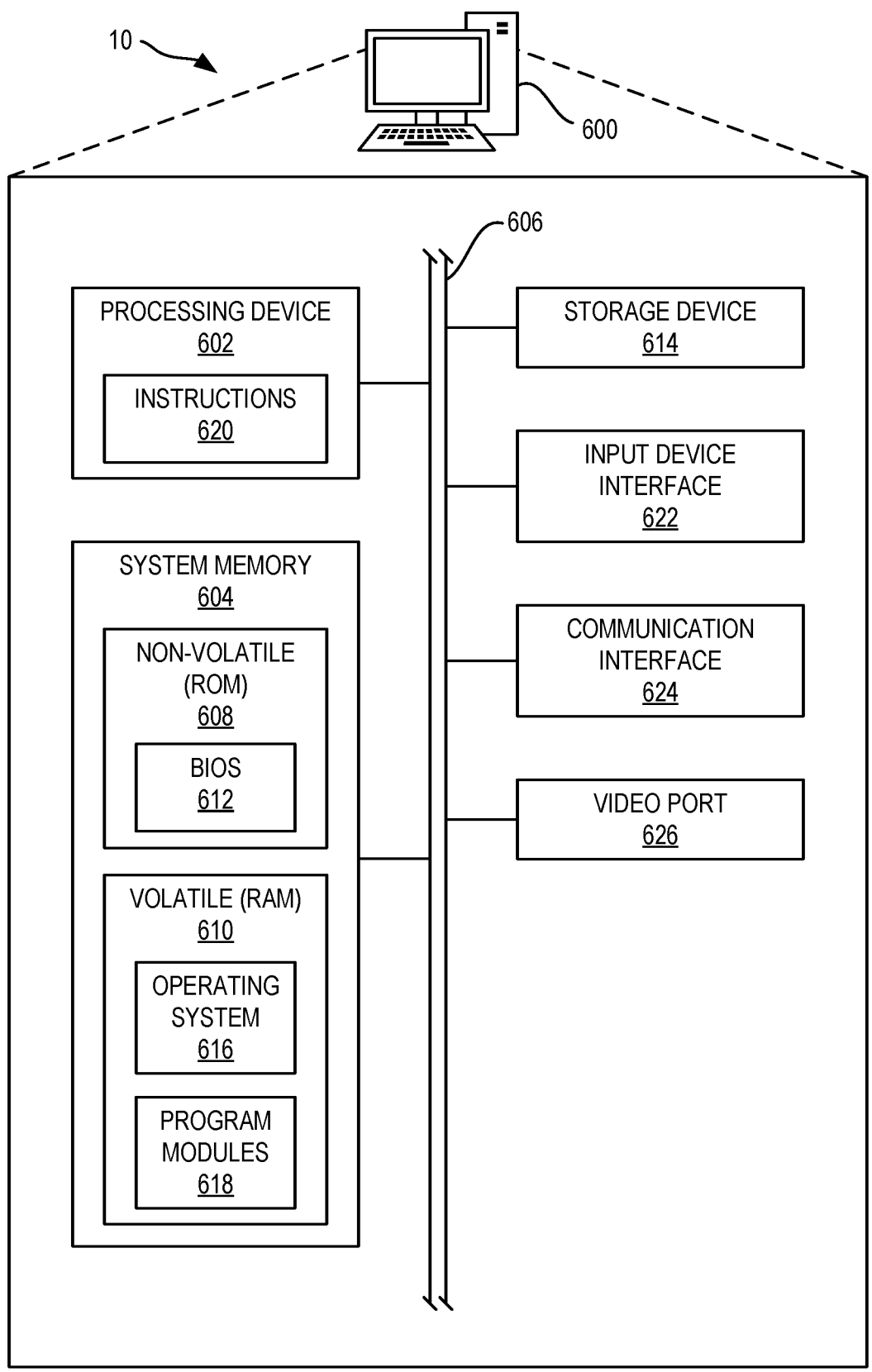
FIG. 6 is a block diagram of a computer system suitable for implementing HiLITE according to embodiments disclosed herein.

FIG. 6 is a block diagram of a computer system 600 suitable for implementing HiLITE 10 according to embodiments disclosed herein. Embodiments described herein can include or be implemented as the computer system 600, which comprises any computing or electronic device capable of including firmware, hardware, and/or executing software instructions that could be used to perform any of the methods or functions described above. In this regard, the computer system 600 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 600 in this embodiment includes a processing device 602 or processor, a system memory 604, and a system bus 606. The system memory 604 may include non-volatile memory 608 and volatile memory 610. The non-volatile memory 608 may include read-only memory (ROM), erasable programmable read-only memory (EPROM), electrically erasable programmable read-only memory (EEPROM), and the like. The volatile memory 610 generally includes random-access memory (RAM) (e.g., dynamic random-access memory (DRAM), such as synchronous DRAM (SDRAM)). A basic input/output system (BIOS) 612 may be stored in the non-volatile memory 608 and can include the basic routines that help to transfer information between elements within the computer system 600.

The system bus 606 provides an interface for system components including, but not limited to, the system memory 604 and the processing device 602. The system bus 606 may be any of several types of bus structures that may further interconnect to a memory bus (with or without a memory controller), a peripheral bus, and/or a local bus using any of a variety of commercially available bus architectures.

The processing device 602 represents one or more commercially available or proprietary general-purpose processing devices, such as a microprocessor, central processing unit (CPU), or the like. More particularly, the processing device 602 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 602 is configured to execute processing logic instructions for performing the operations and steps discussed herein.

In this regard, the various illustrative logical blocks, modules, and circuits described in connection with the embodiments disclosed herein may be implemented or performed with the processing device 602, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 602 may be a microprocessor, or may be any conventional processor, controller, microcontroller, or state machine. The processing device 602 may also be implemented as a combination of computing devices (e.g., a combination of a DSP and a microprocessor, a plurality of microprocessors, one or more microprocessors in conjunction with a DSP core, or any other such configuration).

The computer system 600 may further include or be coupled to a non-transitory computer-readable storage medium, such as a storage device 614, which may represent an internal or external hard disk drive (HDD), flash memory, or the like. The storage device 614 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 616 and any number of program modules 618 or other applications can be stored in the volatile memory 610, wherein the program modules 618 represent a wide array of computer-executable instructions corresponding to programs, applications, functions, and the like that may implement the functionality described herein in whole or in part, such as through instructions 620 on the processing device 602. The program modules 618 may also reside on the storage mechanism provided by the storage device 614. As such, all or a portion of the functionality described herein may be implemented as a computer program product stored on a transitory or non-transitory computer-usable or computer-readable storage medium, such as the storage device 614, volatile memory 610, non-volatile memory 608, instructions 620, and the like. The computer program product includes complex programming instructions, such as complex computer-readable program code, to cause the processing device 602 to carry out the steps necessary to implement the functions described herein.

An operator, such as the user, may also be able to enter one or more configuration commands to the computer system 600 through a keyboard, a pointing device such as a mouse, or a touch-sensitive surface, such as the display device, via an input device interface 622 or remotely through a web interface, terminal program, or the like via a communication interface 624. The communication interface 624 may be wired or wireless and facilitate communications with any number of devices via a communications network in a direct or indirect fashion. An output device, such as a display device, can be coupled to the system bus 606 and driven by a video port 626. Additional inputs and outputs to the computer system 600 may be provided through the system bus 606 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for hierarchical power management in a heterogeneous system-on-chip (SoC), the method comprising:
    obtaining a plurality of application tasks for execution by the heterogeneous SoC;
    obtaining, by the heterogeneous SoC, imitation learning (IL) policies for reducing an energy-delay product during execution of the plurality of application tasks;
    applying, by the heterogeneous SoC, the IL policies at a first level to predict power requirements for executing the plurality of application tasks, and
    during run time, adjusting, by the heterogeneous SoC, an execution time of one or more of the plurality of application tasks.

2. The method of claim 1, wherein the plurality of application tasks comprises a plurality of heterogeneous tasks to be multi-tasked by the heterogeneous SoC during runtime.

3. A method of claim 1, wherein:
    the plurality of application tasks has at least one execution deadline; and
    applying the IL policies at the first level comprises applying the IL policies in accordance with the at least one execution deadline.

4. The method of claim 1, wherein applying the IL policies at the first level to predict the power requirements comprises predicting a frequency and number of processing elements for executing the plurality of application tasks according to execution deadlines.

5. The method of claim 4, wherein applying the IL policies at the first level comprise producing a processing schedule for the heterogeneous SoC.

6. The method of claim 5, further comprising, at a second level during run time, dynamically adjusting the processing schedule for the heterogeneous SoC to meet the execution deadlines.

7. The method of claim 1, wherein obtaining the IL policies comprises training the IL policies offline using supervised machine learning.

8. The method of claim 7, wherein obtaining the IL policies further comprises:
    constructing a dynamic oracle; and
    training the IL policies using the dynamic oracle.

9. The method of claim 8, wherein obtaining the IL policies further comprises generating training data for the IL policies using a simulation of the heterogeneous SoC.

10. A method for hierarchical power management in a heterogeneous system-on-chip (SoC), the method comprising:
    obtaining a plurality of application tasks for execution by the heterogeneous SoC, the plurality of application tasks having at least one execution deadline;
    obtaining imitation learning (IL) policies for reducing an energy-delay product during execution of the plurality of application tasks;

applying the IL policies at a first level to predict power requirements for executing the plurality of application tasks; and at a second level during run time, dynamically adjusting an execution time of one or more of the plurality of application tasks to meet the at least one execution deadline, wherein applying the IL policies at the first level comprises applying the IL policies in accordance with the at least one execution deadline.

11. A dynamic power management (DPM) framework, comprising:

a heterogeneous system-on-chip (SoC) simulator configured to simulate execution of a plurality of application tasks by a heterogeneous SoC; and a power manager configured to apply imitation learning (IL)-based power policies to the heterogeneous SoC during execution of the plurality of application tasks, the power manager comprising:

a first level configured to make processing power decisions based on predicting power requirements for implementing the IL-based power policies; and a second level configured to adjust the first level processing power decisions during run time.

12. The DPM framework of claim 11, further comprising an oracle configured to train the IL-based power policies of the power manager using the heterogeneous SoC simulator.

13. The DPM framework of claim 12, wherein the oracle is configured to train the IL-based power policies of the power manager to reduce one or more of delay, energy, or energy delay product (EDP) of the heterogeneous SoC simulator.

14. The DPM framework of claim 11, wherein the first level of the power manager predicts a frequency and number of processing elements for executing the plurality of application tasks.

15. The DPM framework of claim 14, wherein the first level processing power decisions comprise a schedule for adjusting processing element frequencies based on the predicted frequency and number of processing elements for executing the plurality of application tasks.

16. The DPM framework of claim 15, wherein the second level is further configured to predict execution time and dynamically adjust the first level processing power decisions according to real-time conditions of the heterogeneous SoC.

17. The DPM framework of claim 16, wherein:

the plurality of application tasks has at least one execution deadline;

the schedule produced by the first level is predicted to meet the at least one execution deadline; and the second level dynamically adjusts the first level processing power decisions to meet the at least one execution deadline in real-time.

18. The DPM framework of claim 11, wherein the first level of the power manager is trained using supervised machine learning that comprises one or more of a decision tree, a regression tree, or a neural network.

19. The DPM framework of claim 18, wherein the second level of the power manager is trained using supervised machine learning that comprises one or more of a decision tree, a regression tree, or a neural network.

20. The DPM framework of claim 11, wherein the heterogeneous SoC comprises one or more general processor clusters and one or more hardware accelerator clusters.

* * * * *